United States Patent
Nakajo et al.

(10) Patent No.: US 7,556,426 B2
(45) Date of Patent: Jul. 7, 2009

(54) RADIATION CASSETTE

(75) Inventors: Masakazu Nakajo, Minamiashigara (JP); Yasunori Ohta, Hadano (JP)

(73) Assignee: FUJIFILM Corporation, Tokyo (JP)

( * ) Notice: Subject to any disclaimer, the term of this patent is extended or adjusted under 35 U.S.C. 154(b) by 953 days.

(21) Appl. No.: 10/933,362

(22) Filed: Sep. 3, 2004

(65) Prior Publication Data

US 2005/0051447 A1    Mar. 10, 2005

(30) Foreign Application Priority Data

| Sep. 5, 2003 | (JP) | ............................. 2003-314226 |
| Feb. 13, 2004 | (JP) | ............................. 2004-036718 |
| Apr. 6, 2004 | (JP) | ............................. 2004-112006 |

(51) Int. Cl.
    *G03B 42/04* (2006.01)

(52) U.S. Cl. ...................... 378/188; 378/182

(58) Field of Classification Search ................. 378/167, 378/169, 170, 172, 174, 182, 185, 186, 187, 378/188

See application file for complete search history.

(56) References Cited

U.S. PATENT DOCUMENTS

| 4,380,087 A | * | 4/1983 | Tanaka | ....................... 378/186 |
| 5,101,423 A | * | 3/1992 | Okamoto et al. | ............ 378/182 |
| 6,557,705 B1 | * | 5/2003 | Nakajo et al. | ............... 206/455 |
| 2002/0085680 A1 | * | 7/2002 | Nakajo | ....................... 378/182 |

FOREIGN PATENT DOCUMENTS

| JP | 5-281636 A | 10/1993 |
| JP | 11-271894 A | 10/1999 |
| JP | 2000-249795 A | 9/2000 |
| JP | 2003-114484 A | 4/2003 |
| JP | 2003-199734 A | 7/2003 |
| JP | 2003-207864 A | 7/2003 |

* cited by examiner

*Primary Examiner*—Hoon Song
(74) *Attorney, Agent, or Firm*—Sughrue Mion, PLLC

(57) ABSTRACT

A radiation cassette has a casing for storing a stimulable phosphor plate and a lid openably and closably mounted on the casing. The lid has a guide structure for guiding the stimulable phosphor plate when the radiation image recording medium is removed or inserted into the cassette while the lid is open with respect to the casing. The guide structure has a pair of engaging members fixed to an inner surface of the lid and a pair of recesses that are defined in respective opposite side edges of the stimulable phosphor plate.

15 Claims, 20 Drawing Sheets

RADIATION CASSETTE

BACKGROUND OF THE INVENTION

1. Field of the Invention

The present invention relates to a radiation cassette for storing therein a plate-like radiation image recording medium on which the radiation image information of a subject is recorded.

2. Description of the Related Art

There is known a system in which a stimulable phosphor is used to record radiation image information of a subject such as a human body or the like, and the recorded radiation image information is reproduced on a photographic photosensitive medium such as a photographic film, or output to a display unit such as a CRT.

The stimulable phosphor is a phosphor which, when exposed to an applied radiation (X-rays, α-rays, β-rays, γ-rays, electron beams, ultraviolet radiation, or the like), stores a part of the energy of such radiation, and, when subsequently exposed to applied stimulating light such as visible light, emits light in proportion to the intensity of the stored radiation energy. The stimulable phosphor is normally shaped as a plate and used in the form a stimulable phosphor plate.

It has been customary, when applying radiation, e.g., X-rays, to a subject such as a human body or the like, to record the radiation image information of the subject directly on a photographic film. The photographic film is then subjected to a development process to produce a visible image thereon, which will be used for medical diagnosis or the like.

A radiation image recording medium, such as a stimulable phosphor plate or a photographic film, is usually stored in a cassette, which is loaded into an imaging apparatus. In the imaging apparatus, X-rays are applied to the radiation image recording medium through the cassette. One known cassette for storing such a radiation image recording medium is disclosed in Japanese Laid-Open Patent Publication No. 11-271894, for example.

FIG. 20 of the accompanying drawings shows a cassette 1, as disclosed in the above Laid-Open Patent Publication, which comprises a pair of case members 2a, 2b fastened to each other by screws and having an opening 3 defined in one end thereof. The cassette 1 also includes a tray 4 removably disposed in the opening 3, and a radiation image conversion plate 5 fixed to the tray 4. The tray 4 has a cap 6 which closes the opening 3 when the tray 4 is fully inserted into the case members 2a, 2b.

The tray 4 is relatively heavy as a whole because of the cap 6 mounted on the tray 4 and due to the radiation image conversion plate 5 fixed thereto. Therefore, the mechanism by which the tray 4 is inserted into and removed from a radiation image recording and reading apparatus loaded with the cassette 1 likewise must be considerably large and heavy.

Furthermore, since the tray 4 is inserted into a narrow opening 3 of the cassette 1, the tray 4 must be accurately controlled in order to properly insert the tray 4 into the opening 3. As a result, the mechanism for inserting and removing the tray 4 is required to be precise in structure and highly accurate in operation, making the radiation image recording and reading apparatus highly costly to manufacture.

SUMMARY OF THE INVENTION

It is a general object of the present invention to provide a radiation cassette, which is of a compact and simple structure, allowing a radiation image recording medium to be smoothly inserted into and removed from the cassette, and which conserves space.

A major object of the present invention is to provide a radiation cassette which allows a radiation image recording medium to be inserted into and removed from the cassette without causing damage to the radiation image recording medium.

Another object of the present invention is to provide a radiation cassette which allows a plurality of simultaneously stored radiation image recording mediums to be inserted into and removed from the cassette without causing damage to the radiation image recording mediums.

A radiation cassette according to the present invention comprises a casing for storing a radiation image recording medium, such as a stimulable phosphor plate, and a lid openably and closably mounted on the casing. The lid or the casing has a guide structure for guiding the radiation image recording medium, when the radiation image recording medium is removed or inserted while the lid is open with respect to the casing.

The guide structure preferably includes a pair of engaging members facing each other and extending in a direction in which the radiation image recording medium is removed or inserted, and wherein the radiation image recording medium has opposite sides slidably engageable with the engaging members.

Either the engaging members or the opposite sides of the radiation image recording medium may be of a convex shape, with the other being of a concave shape.

Preferably, the radiation cassette further comprises a stopper structure disposed between the casing and the lid for releasably limiting an angle at which the lid may be opened with respect to the casing.

The casing and the lid are preferably coupled to each other by a hinge, and can be closed by a mating structure having grooves and ridges capable of fitting in the grooves. Preferably, the mating structure also comprises seal members.

Preferably, the radiation cassette further comprises an elastic pad disposed on an inner surface of the lid. When the lid closes the casing, the elastic pad presses and holds the radiation image recording medium against an inner surface of the casing on a radiation-irradiated side of the casing.

Preferably, the radiation cassette further comprises a grid for eliminating scattered radiation rays, disposed in the casing, the grid comprising a metal plate or a composite metal (e.g., a metal and rubber or plastic composite material) plate.

At least one of the lid, the casing, or other structural members of the radiation cassette are electrically conductive. The radiation cassette is preferably made of an antibacterial material or a biodegradable resin material, or has been subjected to antibacterial processing.

The lid preferably has a handwriting surface area on which information can repeatedly be written and erased by a writing instrument.

The casing may store two stacked radiation image recording mediums, for performing energy subtraction, in which case the guide structure can be arranged to guide the radiation image recording mediums as they are removed or inserted.

According to the present invention, when guided by the guide structure, the radiation image recording medium can be smoothly and reliably moved along the lid or along the casing. Consequently, even if the lid is open at a relatively small angle with respect to the casing, the radiation image recording medium can be easily removed or inserted without directly contacting the lid or the casing. Thus, the space required for opening and closing the lid is reduced, so that the radiation cassette conserves space within the radiation image reading apparatus, and damage to the radiation image recording medium is prevented as much as possible.

Further, the guide structure includes a pair of engaging members disposed on either the lid or on the casing. Accordingly, the guide structure is very simple in structure and is capable of reliably guiding the stimulable phosphor plate.

Since the angle at which the lid can be opened with respect to the casing is limited by the stopper structure, a specialized opening limiting mechanism need not be provided inside the radiation image reading apparatus. The radiation image reading apparatus can thus be constructed economically. When the limitation on such an opening angle is released, the lid can be opened more completely with respect to the casing, for facilitating maintenance inside the cassette.

The casing and lid are angularly movably joined to each other by a hinge, and have a mating structure comprising grooves and ridges capable of mutual engagement. The radiation cassette is thus prevented from fogging due to the entry of light. Seal members make the radiation cassette effectively more water-resistant, thereby preventing antiseptic solutions, for example, from entering the radiation cassette.

When the lid is angularly moved toward the casing to close the casing, the radiation image recording medium is pressed against an inner surface of the casing under the resiliency of an elastic pad. Because the image recording surface of the radiation image recording medium is pressed into intimate contact with the inner surface (radiation-irradiated surface) of the casing, radiation image information of a subject is reliably recorded with high image quality on the radiation image recording medium.

Furthermore, since the radiation image recording medium is pressed against a scattered radiation prevention grid, consisting of a metal plate or a metal composite plate arranged inside the casing, contact adhesion of the image recording surface of the radiation image recording medium can be improved, and the quality of the recorded image can be assured. The radiation cassette is thus particularly suitable when used in conjunction with linear accelerator (radiotherapy) treatments.

Since the structural members of the radiation cassette are electrically conductive, they are prevented from being electrostatically charged. The radiation image recording medium is thus protected against electrostatic charges. Furthermore, the radiation cassette has an antibacterial capability, and thus sanitary precautions for the radiation cassette are effectively simplified.

Because the radiation cassette is made of a biodegradable material, it can be discarded taking into account environmental concerns.

A handwriting area on the lid allows various items of information to be repeatedly written and erased thereon with a writing instrument, for better working efficiency.

When two radiation image recording mediums are accommodated in the radiation cassette in a stacked fashion, the radiation image recording mediums accommodated in the radiation cassette can be applied to facilitate an energy subtraction process.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
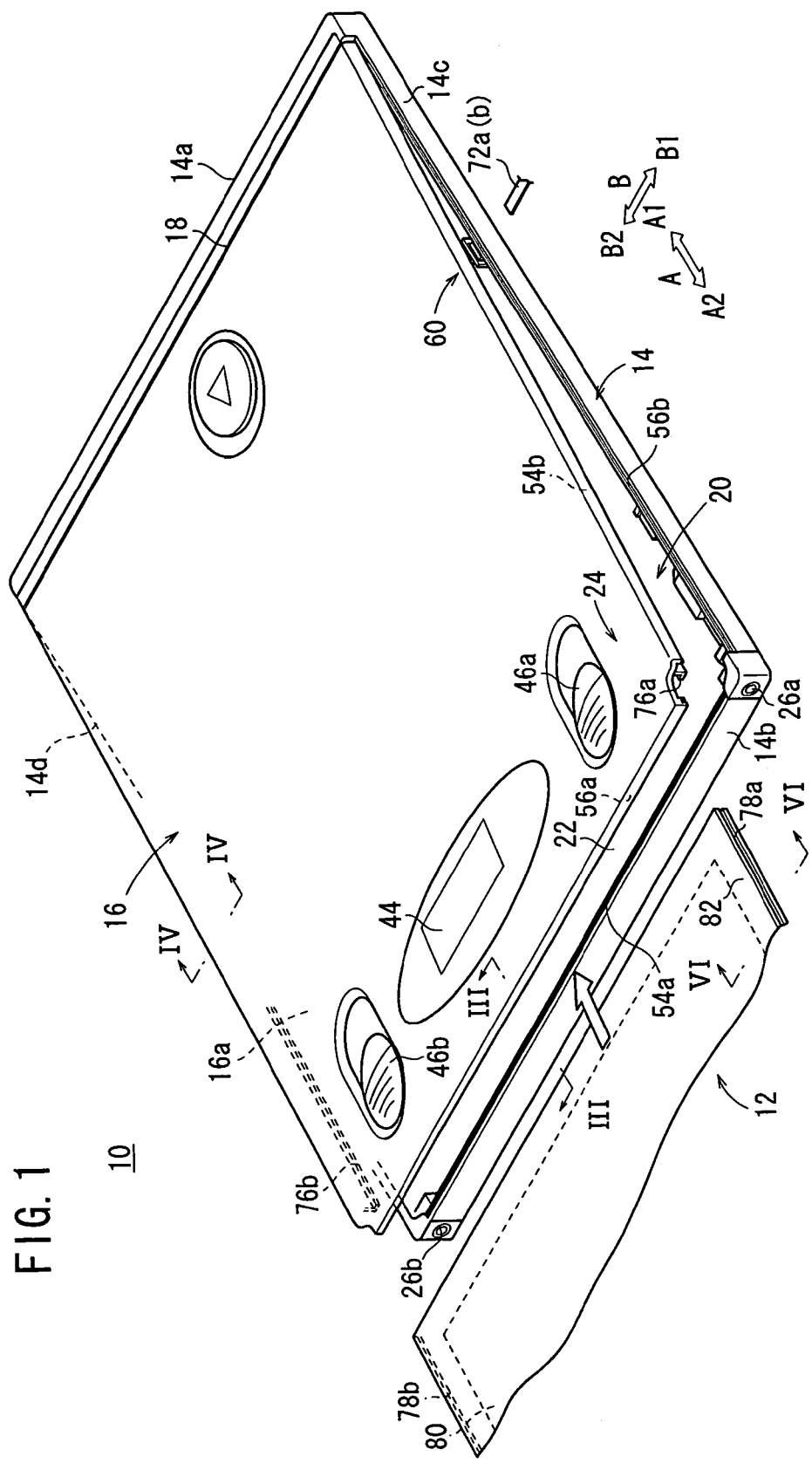
FIG. 1 is a perspective view of a radiation cassette according to an embodiment of the present invention.

FIG. 1 shows in perspective a radiation cassette 10 according to an embodiment of the present invention.

As shown in FIG. 1, the radiation cassette 10 comprises a casing 14 for storing a stimulable phosphor plate (radiation image recording medium) 12 having a radiation applying surface, and a lid 16 openably and closably hinged to an end 14a of the casing 14. The end 14a of the casing 14 and the lid 16 are angularly movably coupled to each other by a resin hinge 18. The lid 16 has a guide structure 20 for guiding the stimulable phosphor plate 12 as it is removed and inserted while the lid 16 is open with respect to the casing 14.

The casing 14 and the lid 16 may be openably and closably hinged to each other by a pin mounted on one of the casing 14 and the lid 16 and fitted into a hole defined in the other of the casing 14 and the lid 16. Alternatively, the casing 14 and the lid 16 may be of an integral structure, and may be opened and closed with respect to each other due to flexibility of the lid 16 at a part where the lid connects to the casing 14.

The casing 14 has an opening 22 defined in the other end 14b thereof, for insertion and removal of a stimulable phosphor plate 12 therethrough. Presser pin insertion holes 26a, 26b for unlocking a lid locking means 24 (to be described later) are defined in the end 14b of the casing 14 on both sides of the opening 22.

Figure 2:
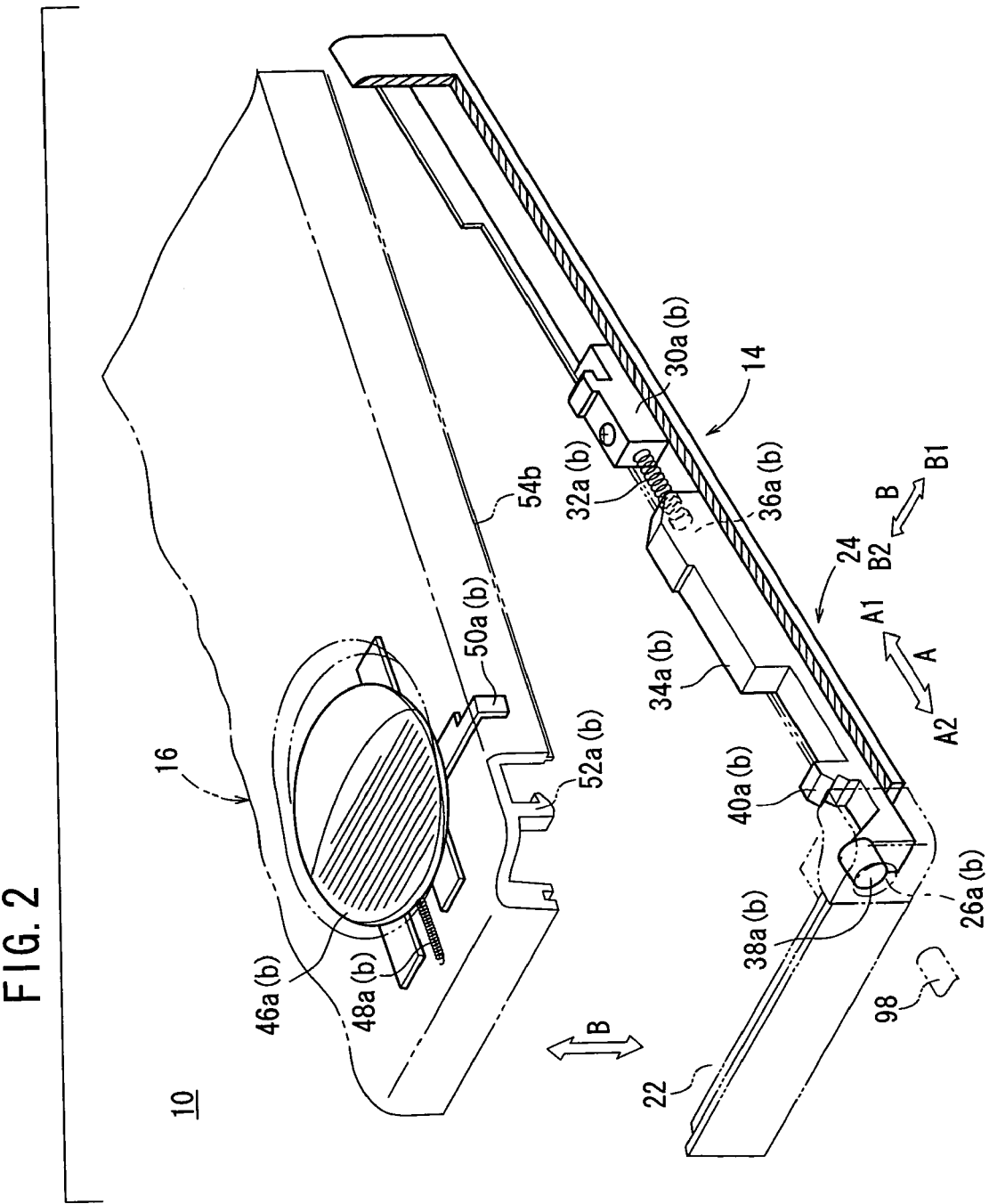
FIG. 2 is a perspective view of a lid locking means of the radiation cassette shown in FIG. 1.

As shown in FIG. 2, the lid locking means 24 comprises fixed blocks 30a, 30b secured to the casing 14 and springs 32a, 32b having first ends engaging the respective fixed blocks 30a, 30b and other ends inserted into respective holes 36a, 36b defined in respective sliders 34a, 34b. The sliders 34a, 34b have cylindrical pin abutments 38a, 38b mounted on their respective distal ends, for insertion into respective holes 26a, 26b in the casing 14. The sliders 34a, 34b also have respective lower locking fingers 40a, 40b spaced a predetermined distance rearwardly (i.e., in the direction indicated by the arrow A1) from the pin abutments 38a, 38b.

As shown in FIG. 1, the lid 16 is formed with a bar-code reader window 44, and the lid locking means 24 has unlocking knobs 46a, 46b disposed one on each side of the bar-code reader window 44. The unlocking knobs 46a, 46b are normally biased forwardly (i.e., in the direction indicated by the arrow A2) by respective springs 48a, 48b (see FIG. 2).

A bar code (not shown) recorded on the stimulable phosphor plate 12 stored in the radiation cassette 10 is read through the bar-code reader window 44. The bar code represents an identification number, or similar indicia, for the stimulable phosphor plate 12. The bar code may be replaced with an IC chip such as an RFID (Radio Frequency Identification) chip or the like mounted on the stimulable phosphor plate 12, the IC chip storing an identification number, patient information, imaging information, etc. If the IC chip is used, then the bar-code reader window 44 is not required, and since the information stored in the IC chip can be read in a non-contact fashion, the IC chip can be positioned on the stimulable phosphor plate 12 with much more freedom than the bar code.

Unlocking plates 50a, 50b engaging the respective sliders 34a, 34b are disposed underneath the unlocking knobs 46a, 46b. The lid 16 has upper locking fingers 52a, 52b projecting from an inner surface 16a thereof for engaging the lower locking fingers 40a, 40b of the sliders 34a, 34b.

Figure 3:
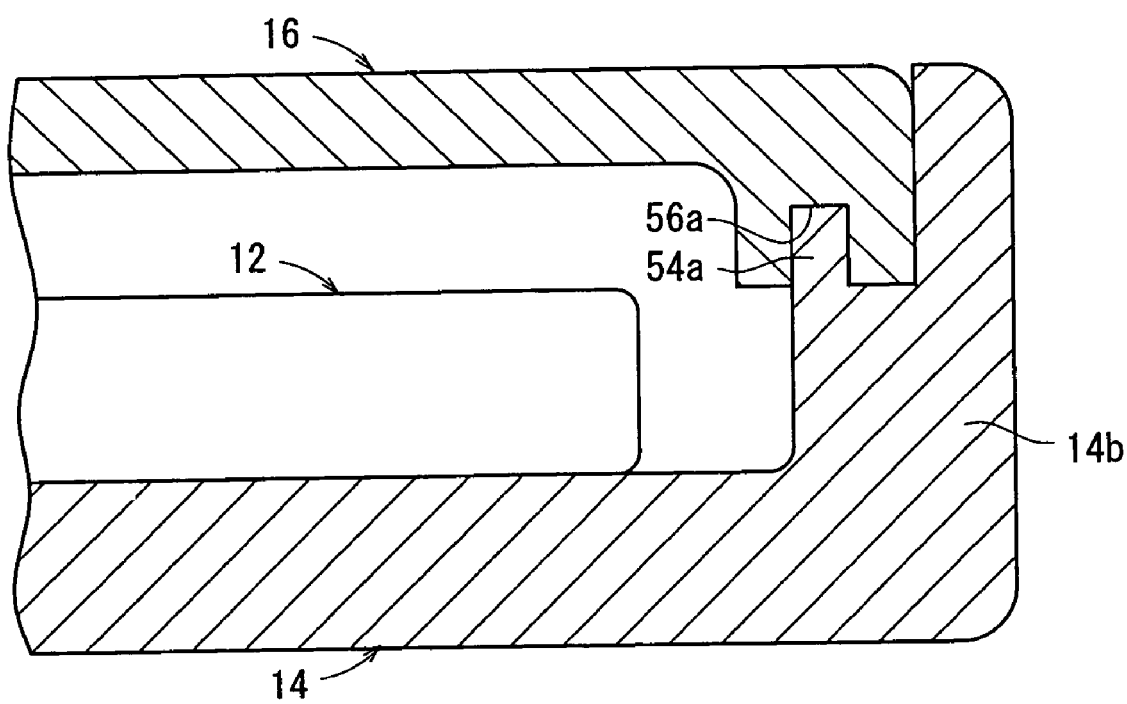
FIG. 3 is an enlarged cross-sectional view taken along line III-III of FIG. 1.
Figure 4:
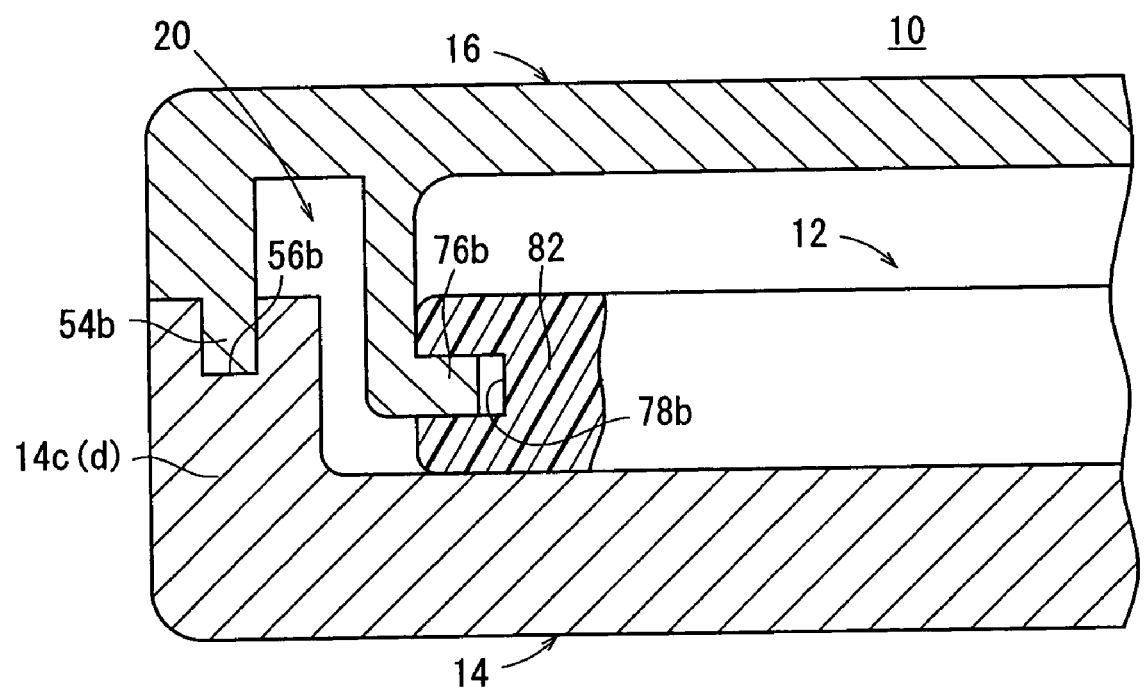
FIG. 4 is an enlarged cross-sectional view taken along line IV-IV of FIG. 1.

As shown in FIGS. 1 and 3, the end 14b of the casing 14 has a ridge 54a projecting toward the lid 16, and the lid 16 has a groove 56a defined therein in facing relation to the ridge 54a. As shown in FIGS. 1 and 4, the casing 14 also has grooves 56b defined in respective side walls 14c, 14d thereof in facing relation to the lid 16. The lid 16 has ridges 54b projecting from respective side edges in facing relation to the grooves 56b. The ridges 54a, 54b are engageable in the respective grooves 56a, 56b, providing a mating structure.

Figure 5:
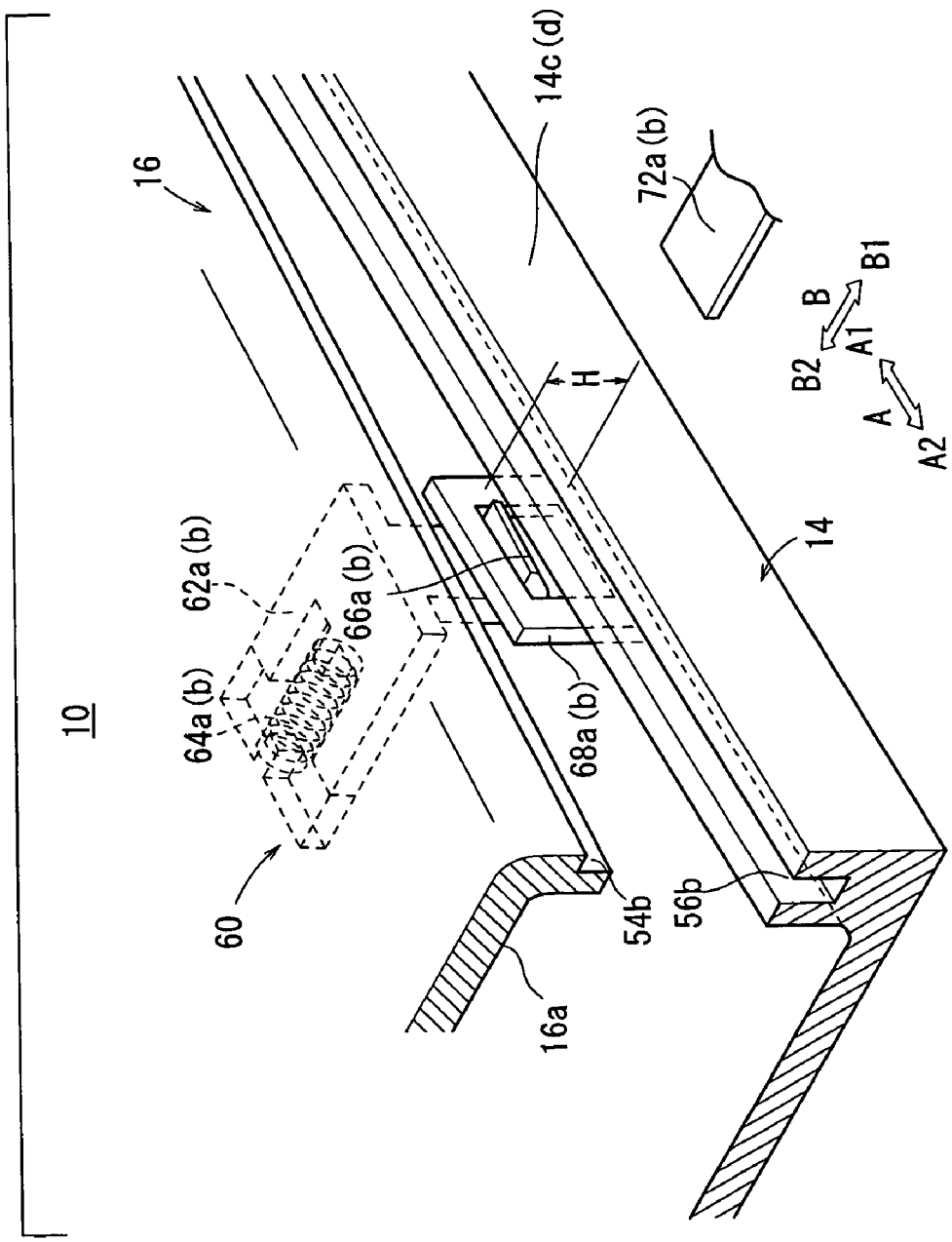
FIG. 5 is an enlarged fragmentary cross-sectional view of a stopper structure of the radiation cassette shown in FIG. 1.

A stopper structure 60 is disposed between the casing 14 and the lid 16 closely to the resin hinge 18 for releasably limiting an angle through which the lid 16 is open with respect to the casing 14. As shown in FIG. 5, the stopper structure 60 has slide members 62a, 62b mounted on opposite sides of the inner surface 16a of the lid 16 for back-and-forth movement in the directions indicated by the arrow B.

The slide members 62a, 62b are normally urged to move outwardly, i.e., in the direction indicated by the arrow B1, by respective springs 64a, 64b. The slide members 62a, 62b have respective teeth 66a, 66b extending from their outer distal ends toward the casing 14 and then toward the side walls 14c, 14d.

Engagement members 68a, 68b which are engageable by their respective teeth 66a, 66b when the lid 16 is opened with respect to the casing 14 are mounted on respective inner surfaces of the side walls 14c, 14d of the casing 14. When the lid 16 is closed over the casing 14, the teeth 66a, 66b and the engagement members 68a, 68b are spaced from each other by a distance H. The distance H is set to a value for maintaining the lid 16 at a set angle through which the lid 16 may be opened with respect to the casing 14. When the slide members 62a, 62b are pushed by unlocking members 72a, 72b, respectively, in the direction indicated by the arrow B2, the teeth 66a, 66b are unlocked from the engagement members 68a, 68b.

As shown in FIGS. 1 and 4, the guide structure 20 is mounted on the inner surface 16a of the lid 16 for guiding the stimulable phosphor plate 12 when the stimulable phosphor plate 12 is removed or inserted, while the lid 16 is open with respect to the casing 14. The guide structure 20 includes a pair of ledges 76a, 76b extending in the directions indicated by the arrow B and disposed on the inner surface 16a parallel to the directions indicated by the arrow A. The ledges 76a, 76b are bent toward each other and provide a linear guide.

The ledges 76a, 76b engage respectively in recesses 78a, 78b that are formed in respective opposite side edges of the stimulable phosphor plate 12 transversely to directions in which the stimulable phosphor plate 12 is removed and inserted, for guiding the stimulable phosphor plate 12 (see FIGS. 1 and 4). The stimulable phosphor plate 12 comprises a rectangular phosphor layer 80 providing a radiation image recording area and a frame 82 covering the four sides and corners of the phosphor layer 80.

The phosphor layer 80 may be in the form of a hard plate comprising a support board made of a hard material such as glass or the like and columnar phosphor bodies evaporated on the support board. The phosphor layer 80 may be produced by evaporating a stimulable phosphor with heat in a vacuum container, and depositing the stimulable phosphor onto a support board using vacuum evaporation, sputtering, CVD, or ion plating.

The columnar phosphor bodies of the phosphor layer 80 extend substantially perpendicularly to the plane of the phosphor layer 80, and are optically independent from each other. The columnar phosphor bodies are highly sensitive to radiation applied thereto, and are effective to reduce granularity in the image produced by the radiation image information stored in the stimulable phosphor plate 12, while also effectively reducing scattering of stimulating light for producing clear image quality.

The phosphor layer 80 may comprise a flexible plate produced by coating a support board with a phosphor (see, for example, Japanese Laid-Open Patent Publication No. 2000-249795). The stimulable phosphor plate 12 is not restricted to one employing a frame 82, but may be applied directly to a flexible plate, as disclosed in Japanese Laid-Open Patent Publication No. 2000-249795.

Figure 6:
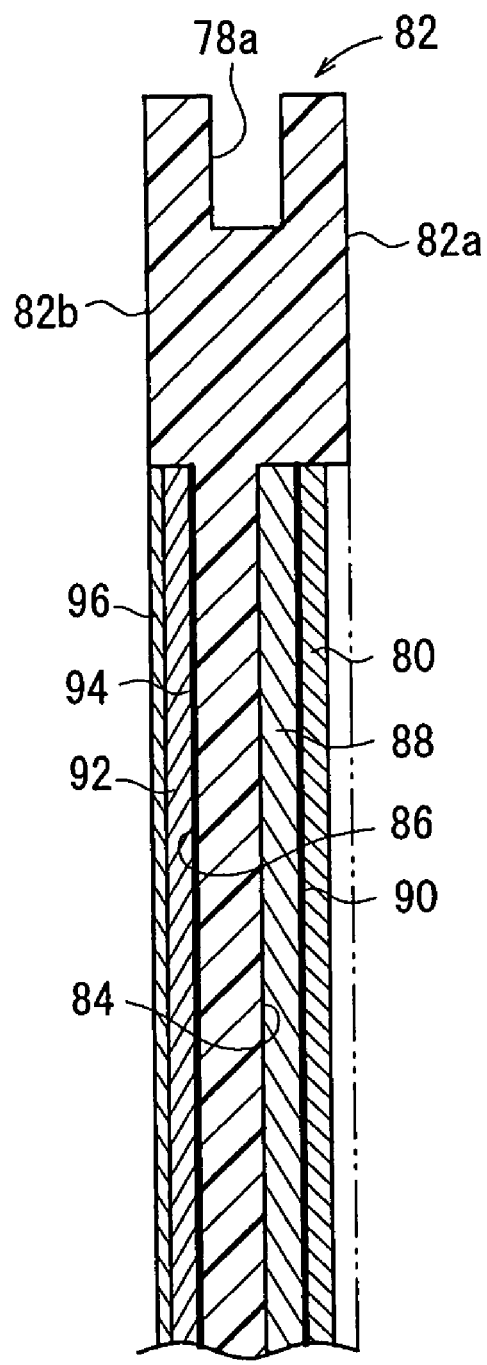
FIG. 6 is an enlarged cross-sectional view taken along line VI-VI of FIG. 1.

The frame 82 is made of a thermoplastic resin such as ABS, polycarbonate, or a polymer alloy of ABS and polycarbonate. The frame 82 has recesses 78a, 78b defined in respective opposite edges thereof. As shown in FIG. 6, the frame 82 has a first cavity 84, having a relatively large depth, which is defined in a surface 82a thereof on the side bearing the phosphor layer 80, and a second cavity 86 of a relatively smaller depth, which is defined on a reverse surface 82b thereof opposite to the surface 82a.

A carbon plate 88 is embedded in the first cavity 84 by insert molding, for example. The phosphor layer 80 is attached to the surface of the carbon plate 88 by a double-sided adhesive tape 90, for example, enabling replacement as needed. A radiation shielding plate 92 for eliminating scattered radiation rays, which is made of a material different from the carbon plate 88, is attached, also in a replaceable manner, to the bottom of the second cavity 86 by a fastening member such as a double-sided adhesive tape 94.

The radiation shielding plate 92 may be made of lead, or a composite material of W (tungsten) and rubber, PP (polypropylene), PE (polyethylene), PET (polyethylene terephthalate), ABS, PC (polycarbonate), or PA (polyamide). A protective plastic plate 96 is mounted on a surface of the radiation shielding plate 92. Alternatively, the radiation shielding plate 92 may be mounted on the lid 16 of the radiation cassette 10, rather than on the stimulable phosphor plate 12.

Figure 7:
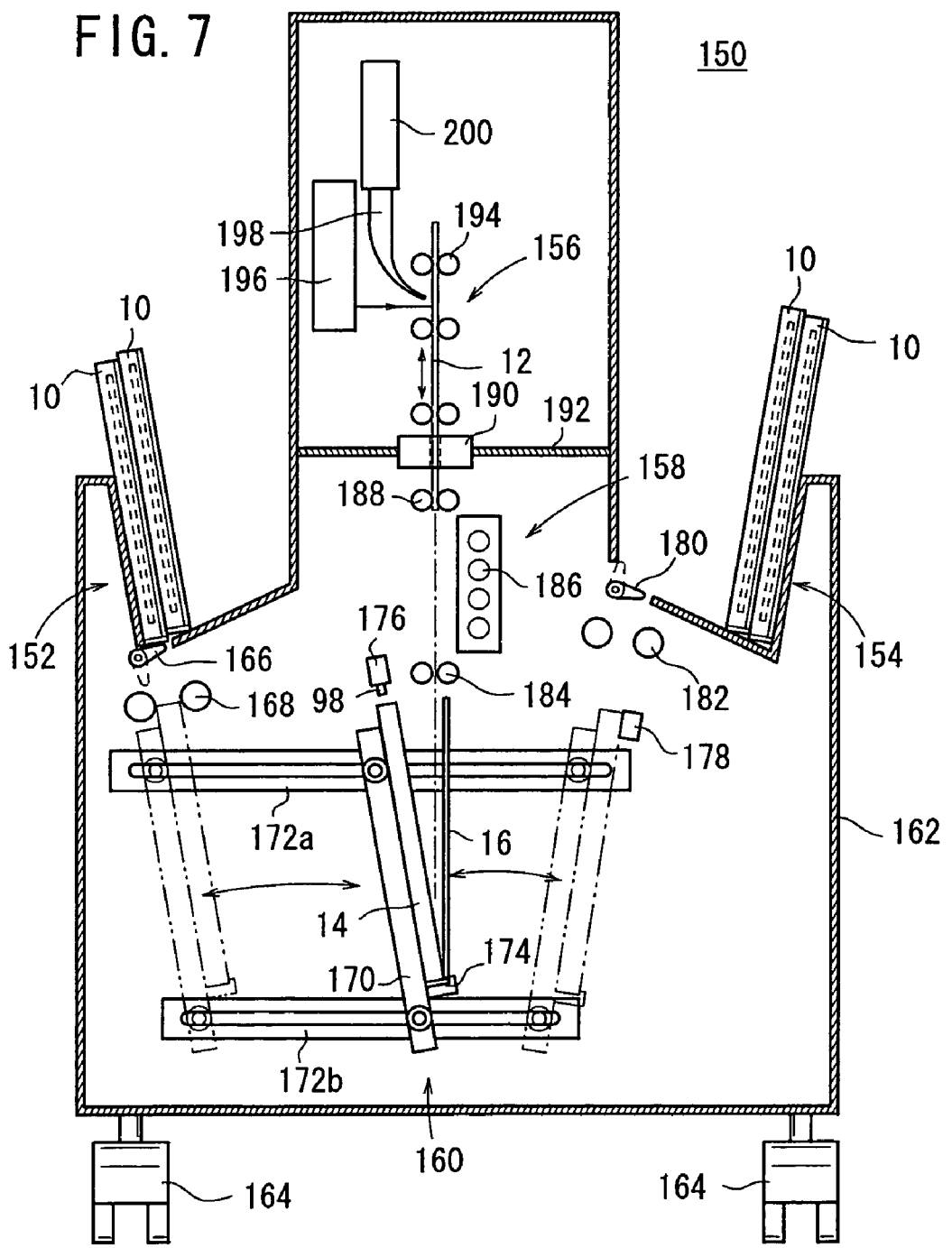
FIG. 7 is a vertical cross-sectional view of a radiation image reading apparatus for reading radiation image information from a stimulable phosphor plate that is loaded in a radiation cassette.

FIG. 7 shows an arrangement of a radiation image reading apparatus 150 for reading radiation image information from the stimulable phosphor plate 12 that is stored in the radiation cassette 10 constructed as described above.

The radiation image reading apparatus 150 comprises a cassette loader 152 for loading a plurality of radiation cassettes 10, a cassette discharger 154 for receiving a plurality of discharged radiation cassettes 10 that have been processed, a reading unit 156 for reading radiation image information from a stimulable phosphor plate 12 that is stored in a radiation cassette 10, an erasing unit 158 for erasing remaining radiation image information from the stimulable phosphor plate 12 from which the desired radiation image information has been read by the reading unit 156, and a feeder 160 for feeding a radiation cassette 10 from the cassette loader 152 through a region below the erasing unit 158 to the cassette discharger 154. The radiation image reading apparatus 150 is enclosed by a casing 162 and is movable by means of casters 164.

A radiation cassette 10 loaded into the cassette loader 152 is introduced into the radiation image reading apparatus 150 through an openable/closable lid 166. Nip rollers 168 are disposed closely to the openable/closable lid 166 in the radiation image reading apparatus 150. A cassette carrier 170, making up part of the feeder 160, can be positioned below the nip rollers 168. The cassette carrier 170 is guided by upper and lower guide members 172a, 172b for movement from a region below the cassette loader 152, through a region below the erasing unit 158, and to a region below the cassette discharger 154. A cassette holder 174 for holding the radiation cassette 10 is mounted on the cassette carrier 170, and is capable of vertical movement along the cassette carrier 170.

An unlocking mechanism 176 having unlocking pins 98, for unlocking the lid 16 of the radiation cassette 10 that has been locked by the lid locking means 24, is disposed beneath the erasing unit 158. A locking mechanism 178 for pressing the lid 16 toward the casing 14 to lock the lid 16 thereon is disposed beneath the cassette discharger 154. Nip rollers 182 for nipping the radiation cassette 10 and discharging the radiation cassette 10 through an openable/closable lid 180 into the cassette discharger 154 is disposed above the locking mechanism 178.

Nip rollers 184 are disposed closely to the unlocking mechanism 176 for nipping and feeding the stimulable phosphor plate 12 from the radiation cassette 10 with the lid 16 being open. The erasing unit 158 is disposed above the nip rollers 184, and has a plurality of erasing light sources 186.

The reading unit 156 is disposed above the erasing unit 158. Nip rollers 188, a shutter mechanism 190, and a light-shielding wall 192 are interposed between the reading unit 156 and the erasing unit 158.

The reading unit 156 is shielded from light by the shutter mechanism 190 and the light-shielding wall 192. The reading unit 156 comprises feed rollers 194 for feeding the stimulable phosphor plate 12 in an auxiliary direction, a laser oscillator 196 for applying stimulating light to the stimulable phosphor plate 12 in the form of a laser beam that is deflected in a main direction, to cause the stimulable phosphor plate 12 to emit light, and a photoelectric transducer 200 for converting the light emitted from the stimulable phosphor plate 12 and collected by a light-collecting guide 198 into an electric signal.

Operation of the radiation cassette 10 thus constructed, and the radiation image reading apparatus 150 which employs the radiation cassette 10, will be described below.

After the radiation image information of a subject is recorded onto the stimulable phosphor plate 12 stored in a radiation cassette 10, the radiation cassette 10 is loaded, with its opening 22 positioned upwardly, into the cassette loader 152 of the radiation image reading apparatus 150.

The radiation cassette 10 that has been loaded into the cassette loader 152 is then introduced into the radiation image reading apparatus 150 via the lid 166 and the nip rollers 168, and held by the cassette carrier 170 of the feeder 160.

The cassette carrier 170 which holds the radiation cassette 10 is guided by the guide members 172a, 172b and fed to the region below the erasing unit 158. As described above, the unlocking mechanism 176 for unlocking the lid 16 is disposed beneath the erasing unit 158. As shown in FIG. 2, when the unlocking pins 98 of the unlocking mechanism 176 are inserted respectively into the holes 26a, 26b in the casing 14, the pin abutments 38a, 38b are pressed in the direction indicated by the arrows A1, moving the sliders 34a, 34b in the direction indicated by the arrows A1 against the resilient forces of the springs 32a, 32b. Therefore, the lower locking fingers 40a, 40b are released from the upper locking fingers 52a, 52b, so that the lid locking means 24 becomes unlocked.

When the lid locking means 24 is unlocked, the lid 16 opens about the resin hinge 18, under the bias of a resilient member (not shown). At this time, as shown in FIG. 5, the slide members 62a, 62b of the stopper structure 60 move in the opening direction in unison with the lid 16 until the teeth 66a, 66b of the slide members 62a, 62b abut against the engagement members 68a, 68b, respectively. Therefore, the lid 16 is maintained at a desired angle, through which the lid 16 is kept open with respect to the casing 14. The stimulable phosphor plate 12 also becomes spaced from the casing 14 in unison with the lid 16 by the guide structure 20, and is moved to a region directly beneath the nip rollers 184 disposed underneath the erasing unit 158 (see FIG. 7).

Then, the stimulable phosphor plate 12 together with the lid 16 is nipped by the nip rollers 184, and the stimulable phosphor plate 12 is drawn out along the inner surface 16a of the lid 16 while being guided by the ledges 76a, 76b and recesses 78a, 78b of the guide structure 20.

The stimulable phosphor plate 12 that has been drawn out from the radiation cassette 10 is supplied to the reading unit 156 via the nip rollers 188 and the shutter mechanism 190. The stimulable phosphor plate 12, which has been supplied to the reading unit 156, is fed in the auxiliary direction by the feed rollers 194, while at the same time the stimulable phosphor plate 12 is irradiated with stimulating light emitted from the laser oscillator 196 as it is deflected in the main direction. Application of the stimulating light to the stimulable phosphor plate 12 causes the stimulable phosphor plate 12 to emit light representative of radiation image information recorded thereon. The emitted light is collected by the light-collecting guide 198 and applied to the photoelectric transducer 200, which converts the light into an electric signal.

After the recorded radiation image information is read from the stimulable phosphor plate 12 by the reading unit 156, the stimulable phosphor plate 12 is fed from the reading unit 156 to the erasing unit 158. The erasing unit 158 applies erasing light from erasing light sources 186 to the stimulable phosphor plate 12, erasing any remaining radiation energy from the stimulable phosphor plate 12.

After the remaining radiation energy has been erased from the stimulable phosphor plate 12 by the erasing unit 158, the stimulable phosphor plate 12 is reinserted into the lid 16 of the radiation cassette 10, which has been held in place beneath the erasing unit 158, while being guided by the guide structure 20. Then, the radiation cassette 10 is fed by the cassette carrier 170 to the region below the cassette discharger 154, after which the lid 16 is pressed toward the casing 14 by the locking mechanism 178.

At this time, the upper lock fingers 52a, 52b on the inner surface 16a of the lid 16 engage the respective lower locking fingers 40a, 40b of the sliders 34a, 34b, pushing the lower locking fingers 40a, 40b in the direction indicated by the arrow A1. The sliders 34a, 34b are moved in the direction indicated by the arrow A1, and then moved back in the direction indicated by the arrow A2 under the bias of the springs 32a, 32b. The lower locking fingers 40a, 40b and the upper lock fingers 52a, 52b are now brought into locking engagement with each other, securing the lid 16 to the casing 14.

The radiation cassette 10 with the lid 16 locked in place is then discharged into the cassette discharger 154 via the nip rollers 182 and the openable/closable lid 180.

In the present embodiment, the ledges 76a, 76b of the guide structure 20 extend in directions indicated by the arrow A and are disposed on the inner surface 16a of the lid 16. Recesses 78a, 78b are defined in respective opposite side edges of the stimulable phosphor plate 12 for receiving the ledges 76a, 76b respectively therein. Therefore, while being guided by the ledges 76a, 76b and recesses 78a, 78b, the stimulable phosphor plate 12 is smoothly and reliably moved along the inner surface 16a of the lid 16.

Consequently, even though the lid 16 is open at a relatively small angle with respect to the casing 14, during movement the stimulable phosphor plate 12 does not directly abut against the lid 16 or the casing 14, but can be easily removed and inserted. The space required for opening and closing the lid 16 is thus reduced, so that the radiation cassette 10 conveniently conserves space within the radiation image reading apparatus 150, while the stimulable phosphor plate 12 is prevented from suffering damage as much as possible.

The guide structure 20 may be made up only of the ledges 76a, 76b and the recesses 78a, 78b. Accordingly, the guide structure 20 is highly simple in structure and is capable of reliably guiding the stimulable phosphor plate 12.

Figure 8:
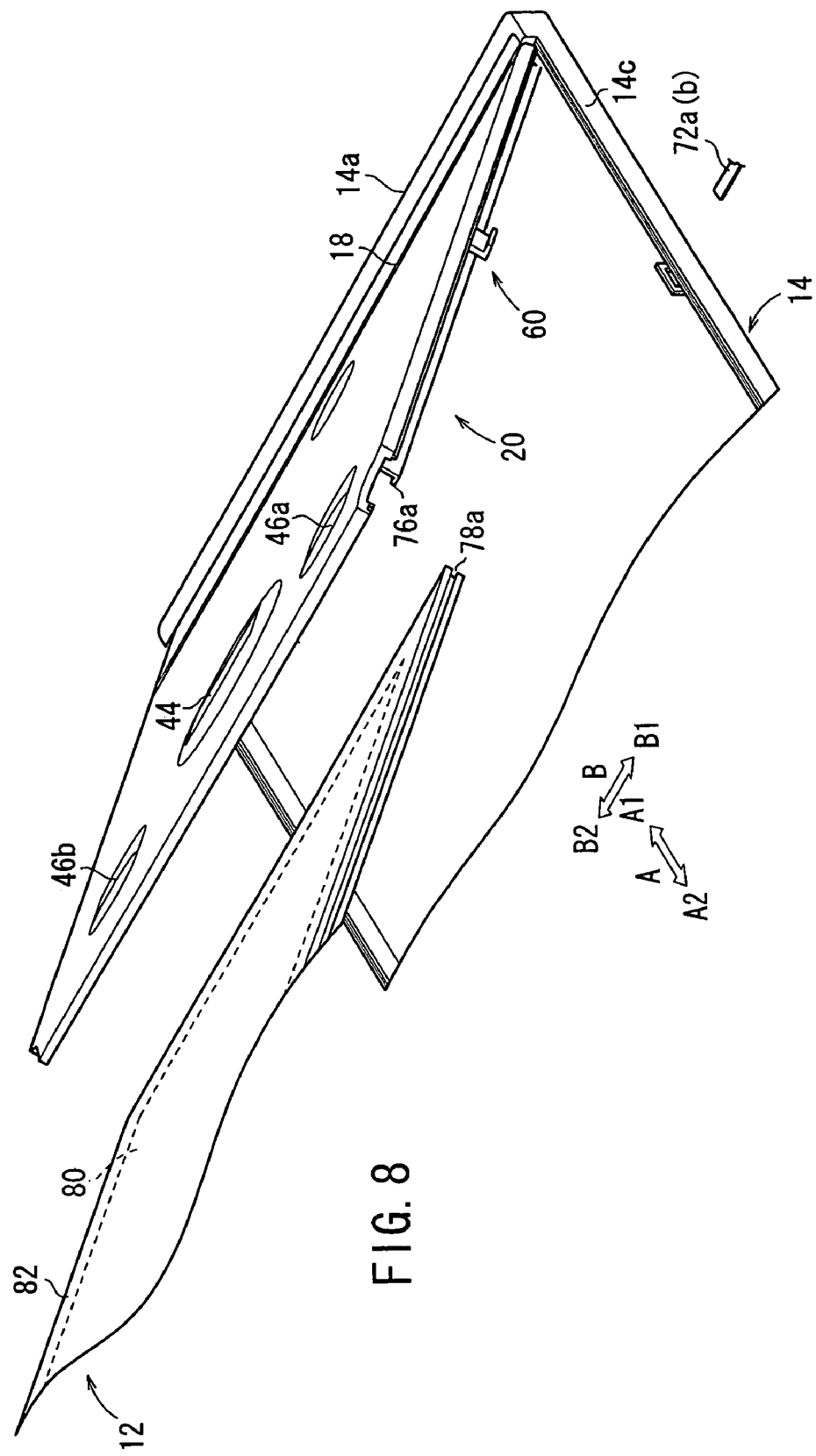
FIG. 8 is a fragmentary perspective view of the radiation cassette with the stopper structure released.

Since the angle through which the lid 16 opens with respect to the casing 14 is limited by the stopper structure 60, no special opening limiting mechanism needs to be provided in the radiation image reading apparatus 150. The radiation image reading apparatus 150 can thus be constructed economically. When the slide members 62a, 62b are pressed by the unlocking members 72a, 72b, the slide members 62a, 62b are moved in the direction indicated by the arrow B2, releasing the teeth 66a, 66b from engagement with the engagement members 68a, 68b. When the teeth 66a, 66b become disengaged from the engagement members 68a, 68b, the lid 16 can be opened at a greater angle with respect to the casing 14 for facilitating maintenance inside the radiation cassette 10 (see FIG. 8).

Furthermore, the casing 14 and the lid 16 are angularly movably joined to each other through the resin hinge 18, and have the mating structure constructed of ridges 54a, 54b and grooves 56a, 56b. The radiation cassette 10 is thus prevented from fogging due to the entry of light.

Figure 9:
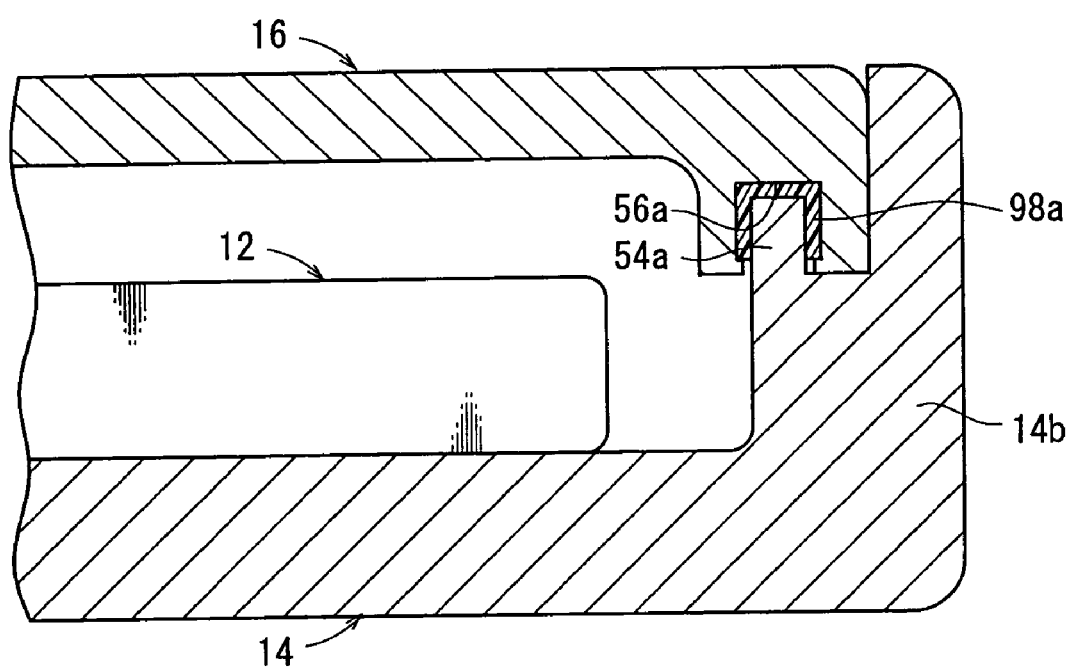
FIG. 9 is an enlarged cross-sectional view showing a seal member disposed in a groove provided in the lid.
Figure 10:
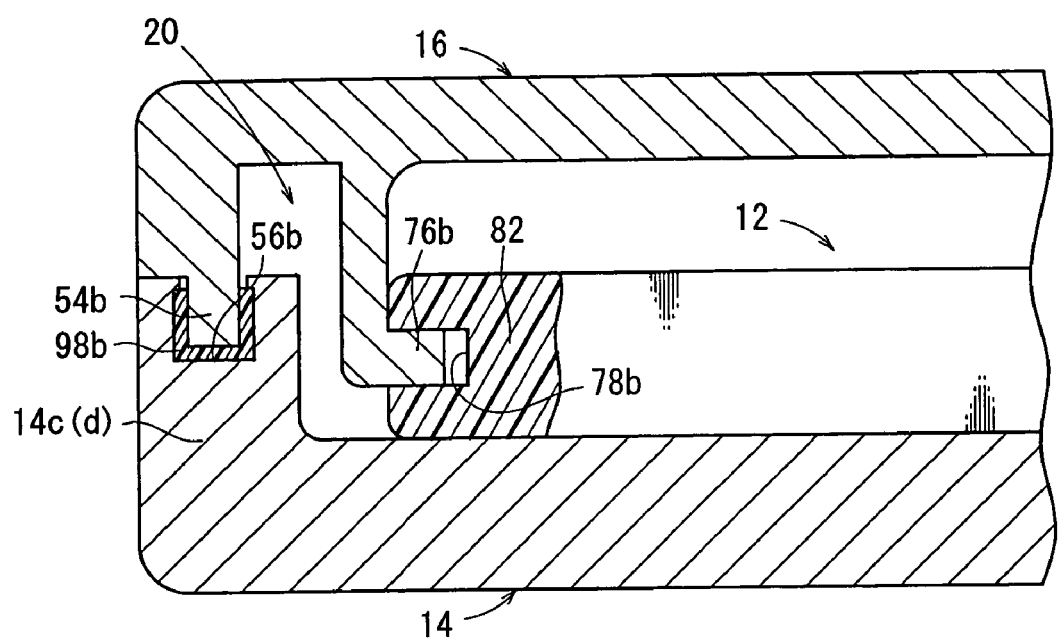
FIG. 10 is an enlarged cross-sectional view showing a seal member disposed in a groove of the casing.

As shown in FIG. 9, a seal member 98a may be disposed in the groove 56a of the lid 16, and, as shown in FIG. 10, a seal member 98b may be disposed in the groove 56b of the casing 14. The seal members 98a, 98b have a sealing function to make the radiation cassette 10 effectively more water-resistant, thereby preventing unwanted solutions, for example, an antiseptic solution, from entering the radiation cassette 10.

At least one of the casing 14, the lid 16, or other structural members of the radiation cassette 10, may be made of an electrically conductive material, or be processed to provide electric conductivity, for preventing them from becoming electrostatically charged. The stimulable phosphor plate 12 is thus protected against electrostatic charges.

Furthermore, if the radiation cassette 10 is made of an antibacterial material, or is subjected to antibacterial processing, then sanitary precautions for the radiation cassette 10 are effectively simplified.

If the radiation cassette 10 is made of a biodegradable material, then it can be discarded after its expected lifetime without causing environmental harm.

Figure 11:
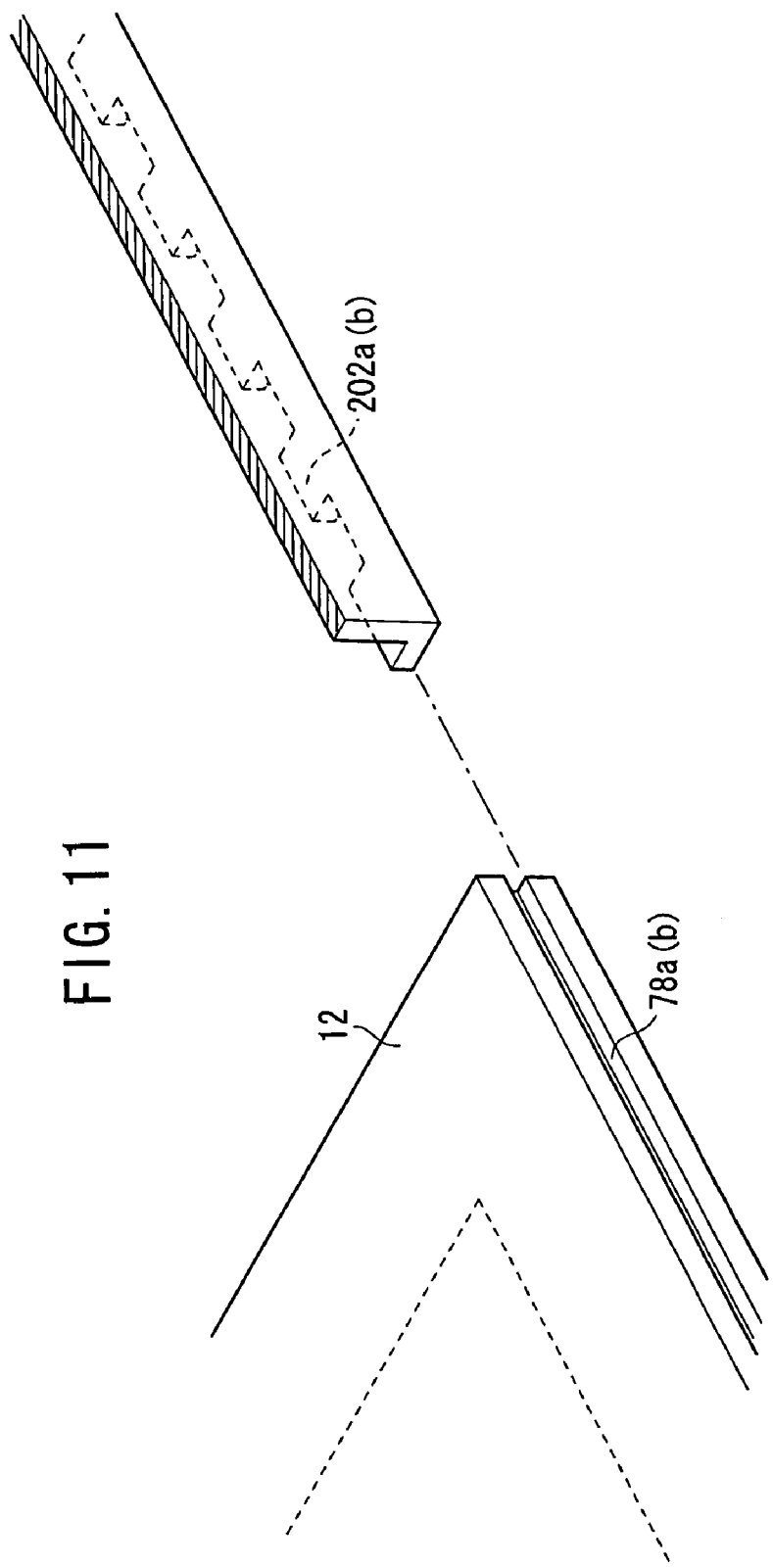
FIG. 11 is a perspective view of a guide structure according to another embodiment of the present invention.
Figure 12:
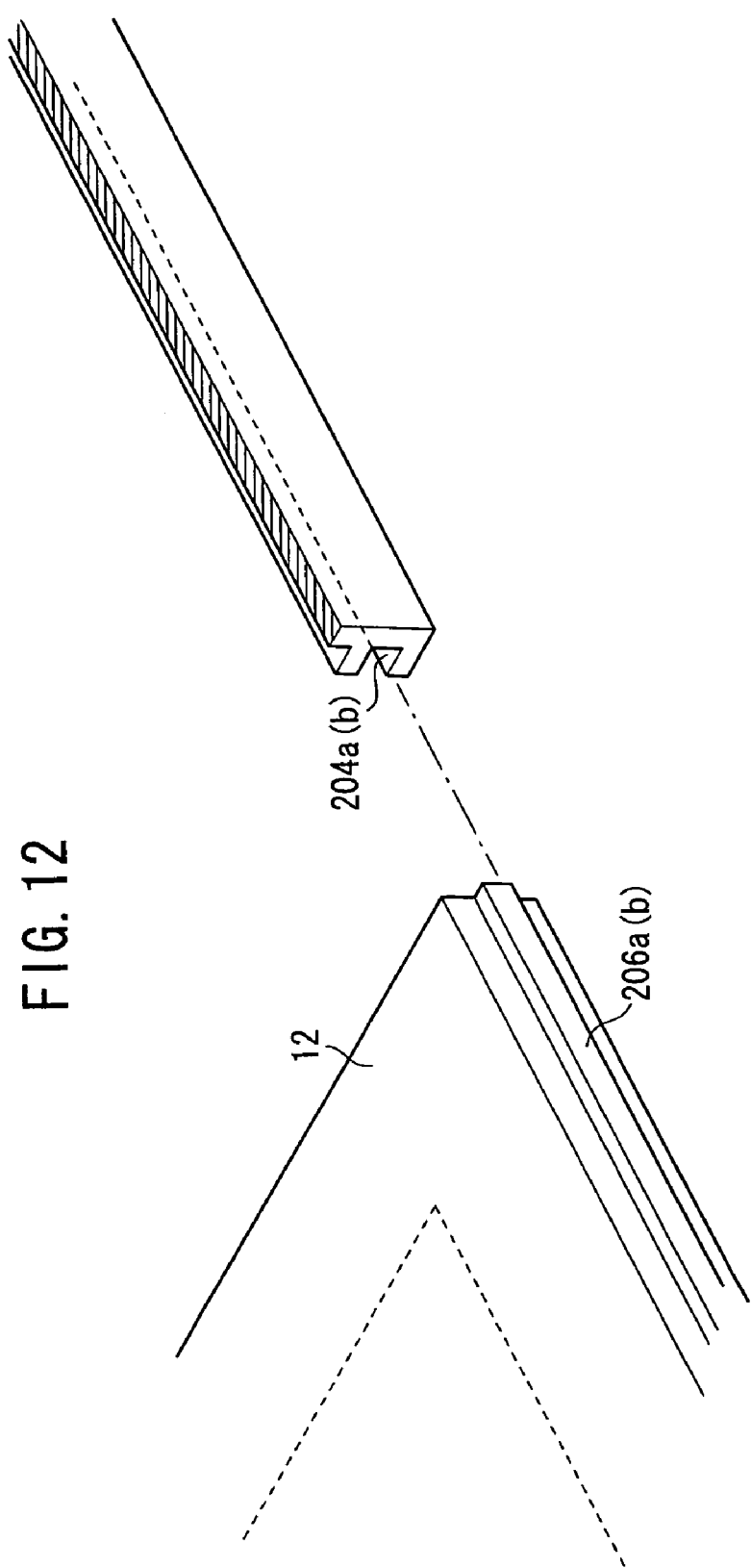
FIG. 12 is a perspective view of a guide structure according to still another embodiment of the present invention.

As shown in FIG. 11, the guide structure 20 which holds the stimulable phosphor plate 12 may have a plurality of spaced teeth 202a, 202b formed on the lid 16 of the radiation cassette 10 and engaging with the recesses 78a, 78b defined in the stimulable phosphor plate 12. Alternatively, as shown in FIG. 12, the guide structure on the lid 16 may comprise recesses 204a, 204b, wherein ridges 206a, 206b are formed on opposite sides of the stimulable phosphor plate 12, so that the ridges 206a, 206b engage with the recesses 204a, 204b.

Figure 13:
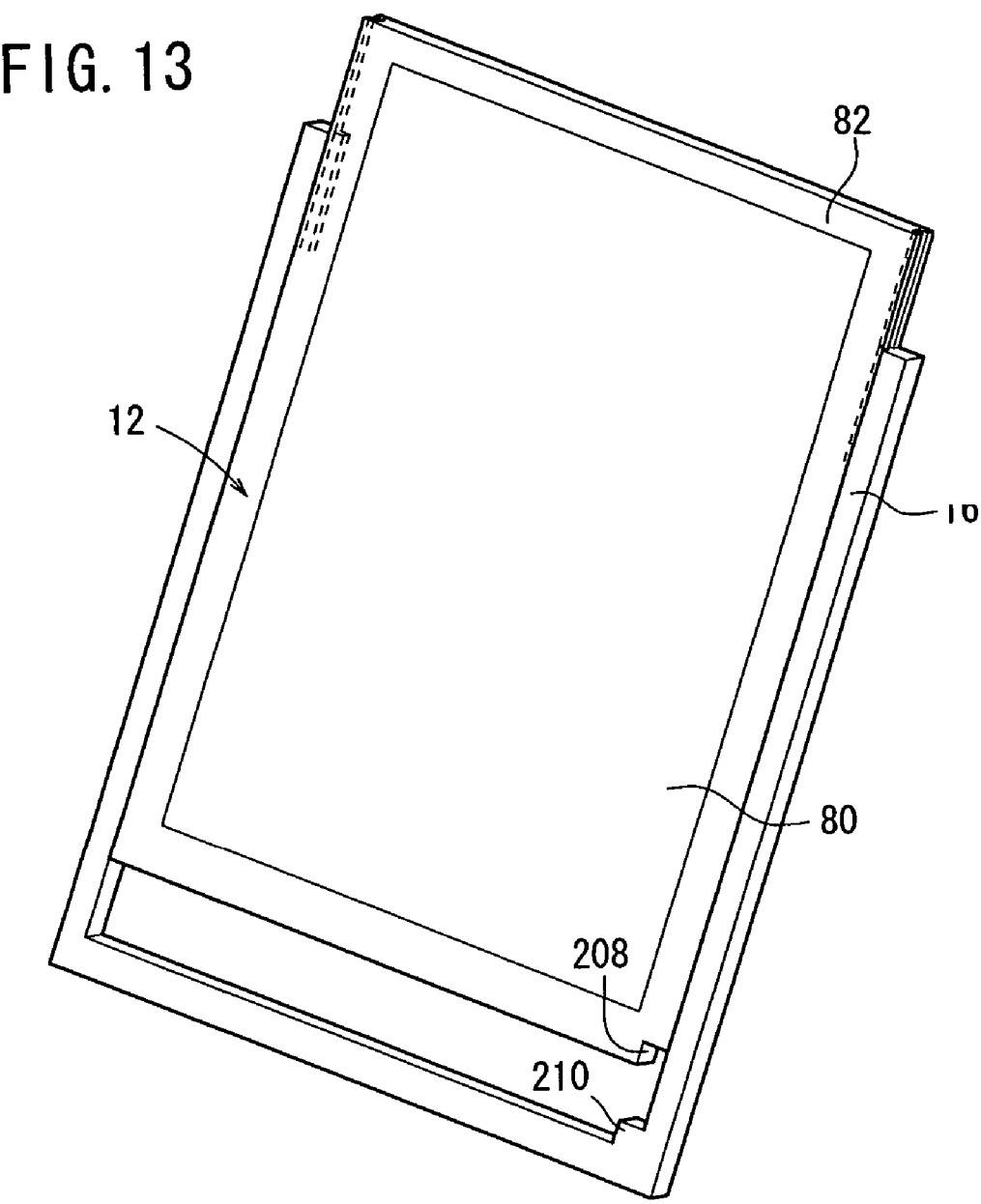
FIG. 13 is a perspective view of a mechanism for preventing a stimulable phosphor plate from being misloaded.

Furthermore, the lid 16 and the stimulable phosphor plate 12 of the radiation cassette 10 may be constructed as shown in FIG. 13, for preventing the stimulable phosphor plate 12 from being loaded in error.

Specifically, a recess 208 is defined in an end corner of the stimulable phosphor plate 12, and a protrusion 210 complementary in shape to the recess 208 is formed on a corner of the lid 16 near the resin hinge 18. When the stimulable phosphor plate 12 and the lid 16 are constructed in this manner, assuming the stimulable phosphor plate 12 is loaded in a normal way, the recess 208 and the protrusion 210 are aligned with each other, allowing the stimulable phosphor plate 12 to be loaded at a predetermined position in the lid 16. Therefore, it can be determined that the stimulable phosphor plate 12 has been loaded properly. When the stimulable phosphor plate 12 is inserted upside down or inside out, since the recess 208 and the protrusion 210 are not aligned with each other, a portion of the stimulable phosphor plate 12 projects from the lid 16. Therefore, it can be determined that the stimulable phosphor plate 12 has been loaded improperly.

Figure 14:
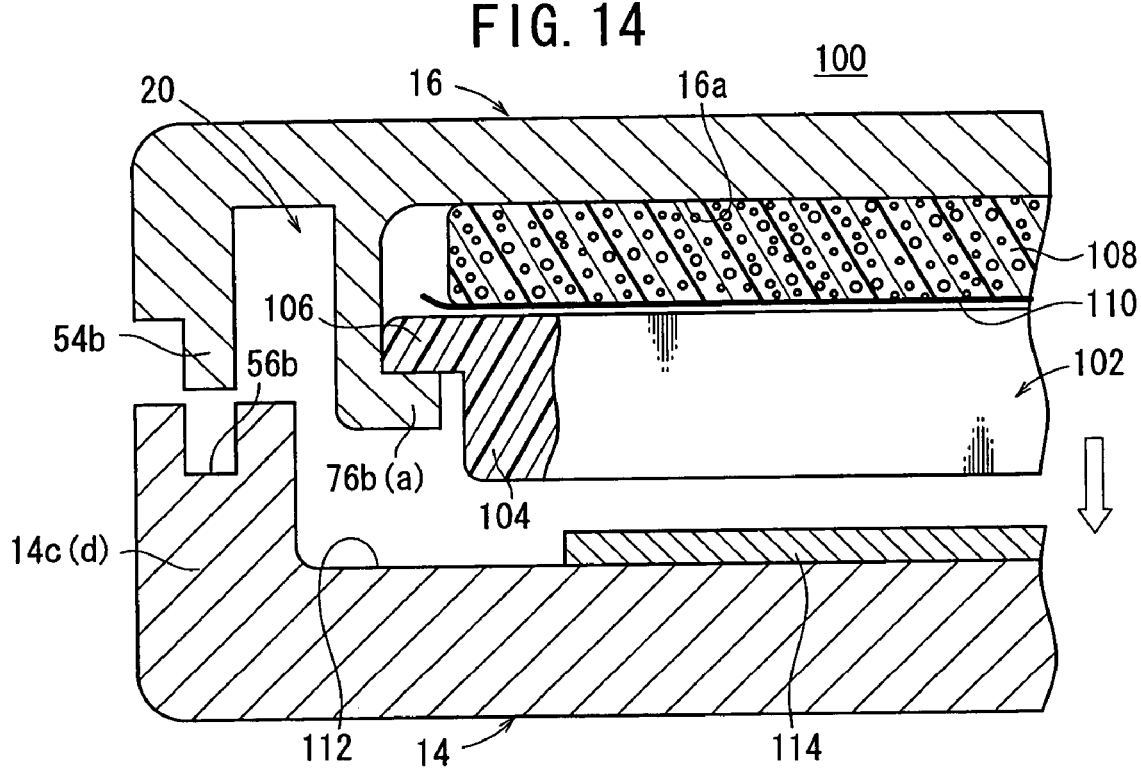
FIG. 14 is a fragmentary cross-sectional view of a radiation cassette according to another embodiment of the present invention, wherein the view shows the radiation cassette in an open state.
Figure 15:
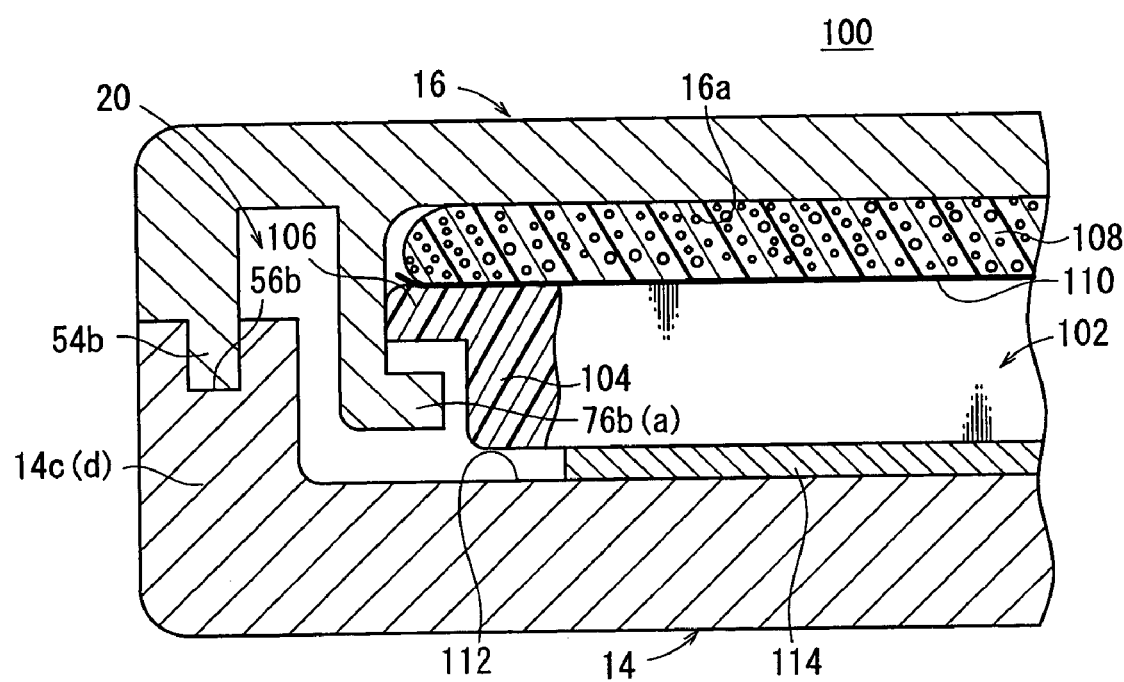
FIG. 15 is a fragmentary cross-sectional view of the radiation cassette according to the other embodiment, wherein the view shows the radiation cassette in a closed state.

FIG. 14 shows in fragmentary cross section a radiation cassette 100 according to another embodiment of the present invention, wherein the radiation cassette 100 is illustrated as being open. Further, FIG. 15 shows the radiation cassette 100 in fragmentary cross section in a closed state. Those parts of the radiation cassette 100 which are identical to those of the radiation cassette 10 are denoted by identical reference characters, and will not be described in detail below. Also, in the other embodiments to be described later on, identical parts will not be described in detail.

The radiation cassette 100 stores a stimulable phosphor plate (radiation image recording medium) 102. The stimulable phosphor plate 102 has a frame 104 having outwardly projecting flanges 106 that are engageable with the ledges 76a, 76b of the guide structure 20.

An elastic pad 108 made of sponge rubber or the like is fixed to the inner surface 16a of the lid 16, and a thin plate 110 is fixed to the elastic pad 108. When the lid 16 is closed over the casing 14, the elastic pad 108 presses and holds the stimulable phosphor plate 102 against an inner surface 112 of the casing 14 on a side thereof to which radiation is applied.

A grid 114 for eliminating scattered radiation rays is disposed in the casing 14. The grid 114 is made of Cu (copper), Pb (lead), Ta (tantalum), Fe (iron), W (tungsten), or a composite material of W (tungsten) and rubber or plastics.

The radiation cassette 100 operates as follows: The stimulable phosphor plate 102 is inserted and removed while the lid 16 is held at a desired angle at which the lid 16 is open with respect to the casing 14, as shown in FIG. 14. At this time, the flanges 106 on opposite sides of the stimulable phosphor plate 102 engage the ledges 76a, 76b of the guide structure 20 and move smoothly along the lid 16.

With the stimulable phosphor plate 102 supported by the guide structure 20, the lid 16 is pressed toward the casing 14, which closes and locks the casing 14.

When the lid 16 is closed on the casing 14, the plate 110 presses a reverse side of the stimulable phosphor plate 102 (i.e., the side opposite to its image recording surface) against the inner surface 112 of the casing 14 under the resiliency of the elastic pad 108 that is fixed to the inner surface 16a of the lid 16. The grid 114, which is in the form of a metal plate or a composite metal plate, is disposed on the inner surface 112 of the casing 14.

Therefore, the image recording surface of the stimulable phosphor plate 102 is reliably pressed and held against the grid 114 under the resiliency of the elastic pad 108. Radiation image information of a subject is thus effectively captured on the stimulable phosphor plate 102. Accordingly, radiation image information having high image quality is reliably recorded on the stimulable phosphor plate 102. The radiation cassette is thus particularly suitable for use in linear accelerator treatments.

Figure 16:
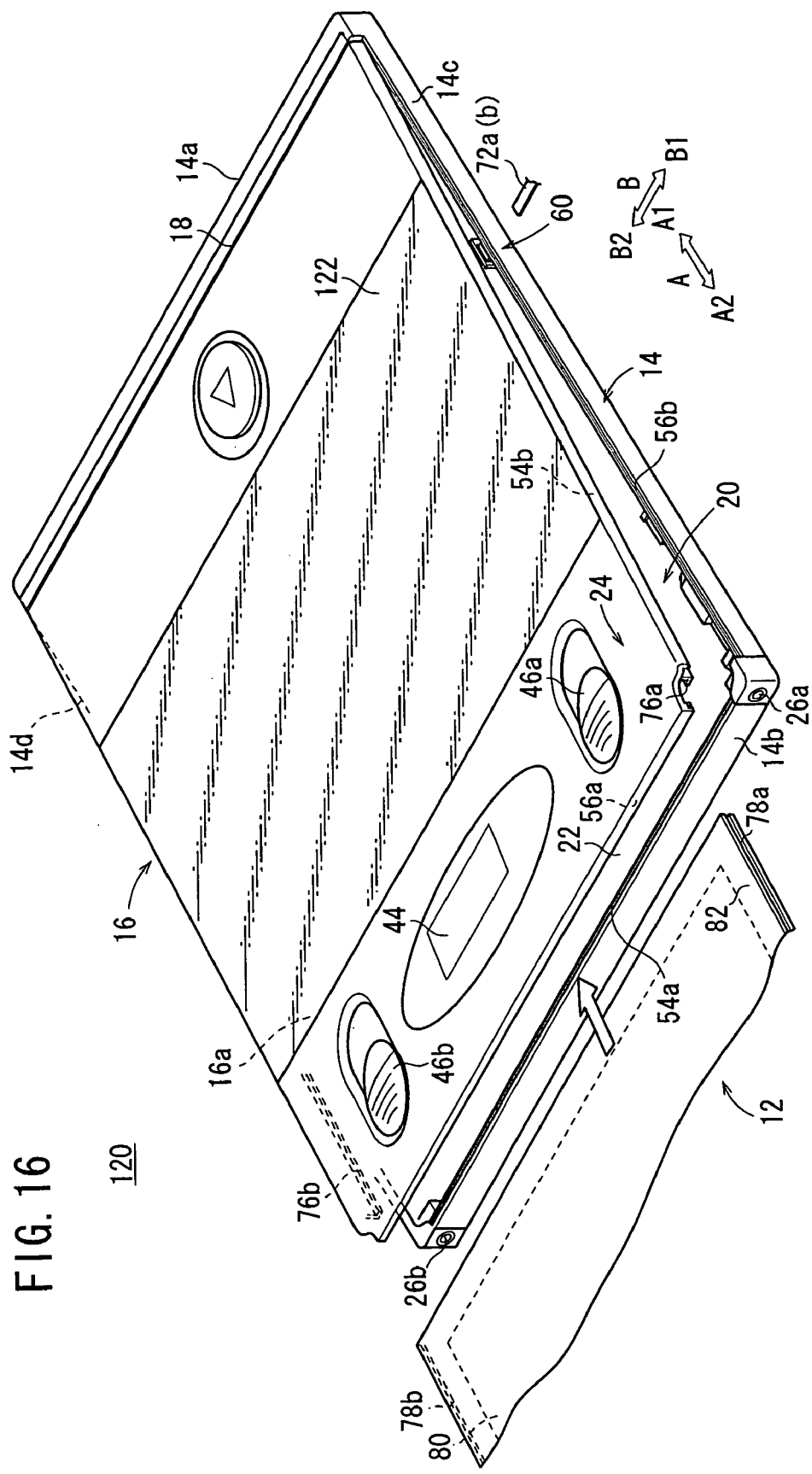
FIG. 16 is a perspective view of a radiation cassette according to still another embodiment of the present invention.

FIG. 16 shows in perspective a radiation cassette 120 according to still another embodiment of the present invention.

As shown in FIG. 16, the radiation cassette 120 comprises a lid 16 including a planar handwriting surface (handwriting area) 122. The handwriting surface 122 comprises a resin plate coated with a melanin-based resin or a fluorine-containing resin. The handwriting surface 122 allows various items of information to be repeatedly written and erased thereon, using a writing instrument such as a paint stick or the like for better working efficiency.

Figure 17:
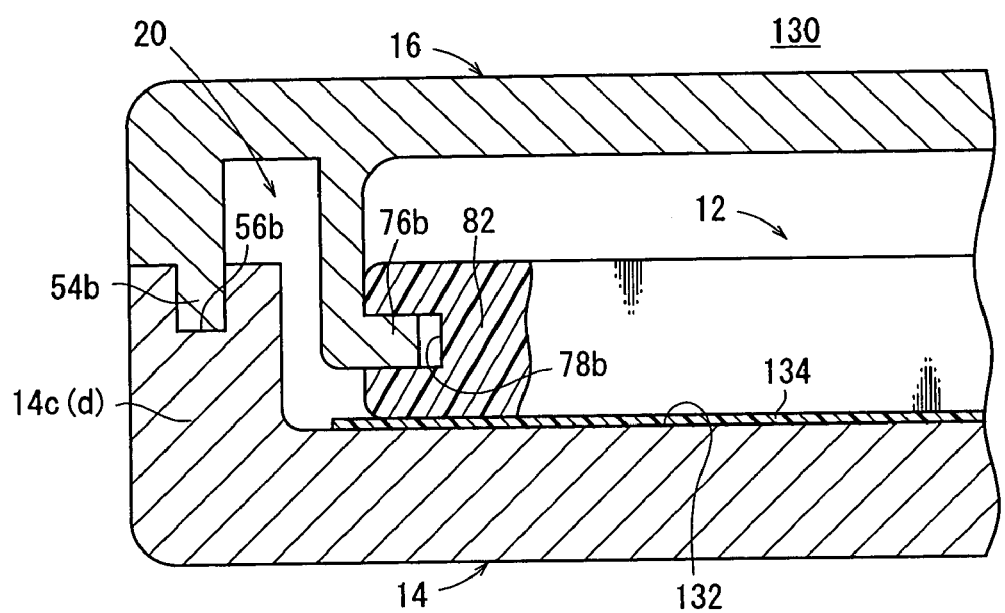
FIG. 17 is a fragmentary cross-sectional view of a radiation cassette according to yet another embodiment of the present invention.

FIG. 17 shows in fragmentary cross section a radiation cassette 130 according to yet another embodiment of the present invention.

As shown in FIG. 17, the radiation cassette 130 has a casing 14 supporting on its inner surface 132 a grid 134 for eliminating scattered radiation rays. The grid 134 is made of white lead, for example, and is attached to the inner surface 132 by a double-sided adhesive tape or the like. Therefore, the radiation cassette 130 improves image quality with a simple arrangement.

Figure 18:
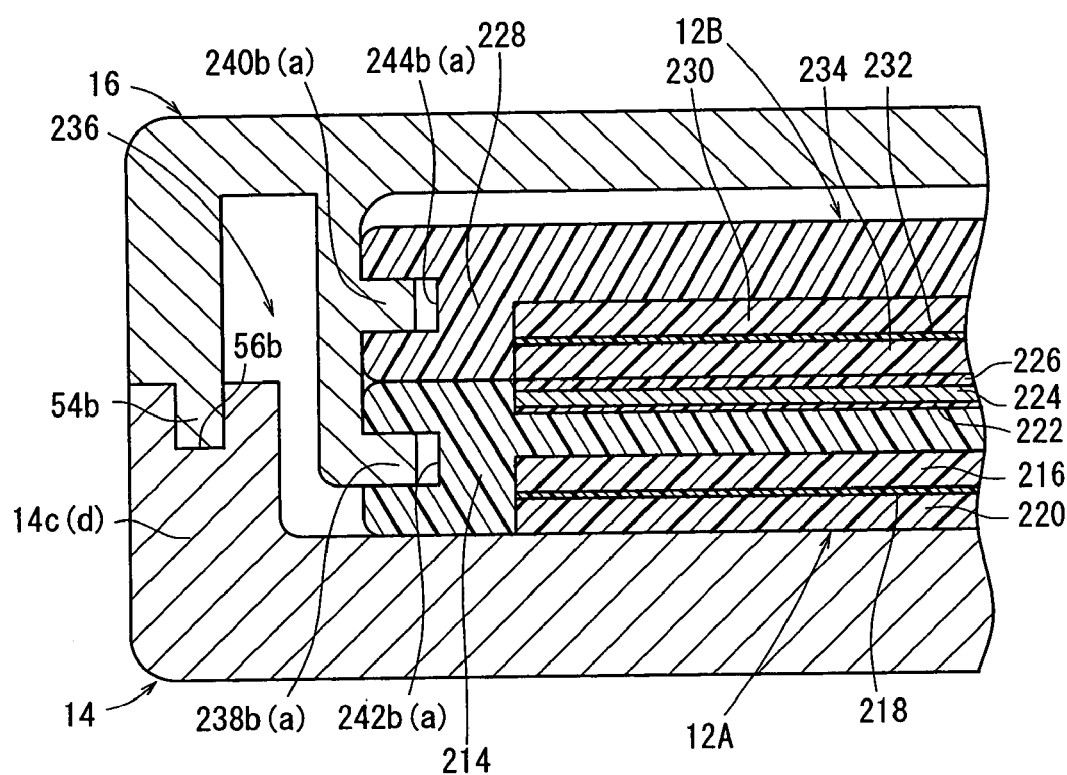
FIG. 18 is a fragmentary cross-sectional view of a radiation cassette according to yet still another embodiment of the present invention.

FIG. 18 shows in fragmentary cross section a radiation cassette 212 according to yet still another embodiment of the present invention.

As shown in FIG. 18, the radiation cassette 212 stores two stimulable phosphor plates 12A, 12B for enabling energy subtraction. The stimulable phosphor plate 12A, which is disposed on the inner surface of the casing 14, has a frame 214 supporting a carbon plate 216 on its radiation-irradiated side. A phosphor layer 220 is attached to the carbon plate 216 by a double-sided adhesive tape 218. A copper plate 224, serving as a radiation energy separation filter for absorbing low radiation energy components, is attached to the surface of the frame 214 remote from the phosphor layer 220 by a double-sided adhesive tape 222. The copper plate 224 has its surface covered with a plastic sheet 226. The stimulable phosphor plate 12B, which is disposed near the lid 16, has a frame 228 supporting a carbon plate 230 on its radiation-irradiated side. A phosphor layer 234 is attached to the carbon plate 230 by a double-sided adhesive tape 232.

The radiation cassette 212 has a guide structure 236 comprising two pairs of ledges 238a, 238b and 240a, 240b, each projecting from the inner surface 16a of the lid 16. Ledges 238a, 238b and 240a, 240b engage respectively in recesses 242a, 242b and 244a, 244b that are defined in respective opposite side edges of the frames 214, 228 of the stimulable phosphor plates 12A, 12B.

The radiation cassette 212 operates as follows: Radiation that has passed through a subject is applied through the casing 14 to the phosphor layer 220 of the stimulable phosphor plate 12A, to record the radiation image information of the subject thereon. Low energy components of the applied radiation are absorbed by the copper plate 224 of the stimulable phosphor plate 12A, and the radiation is then applied to the phosphor layer 234 of the stimulable phosphor plate 12B, in order to record radiation image information of the subject thereon. The radiation cassette 212 is loaded into the radiation image reading apparatus 150, which reads the radiation image information from the stimulable phosphor plates 12A, 12B. Therefore, the read radiation image information is subjected to an energy subtraction process to obtain differential radiation image information.

Figure 19:
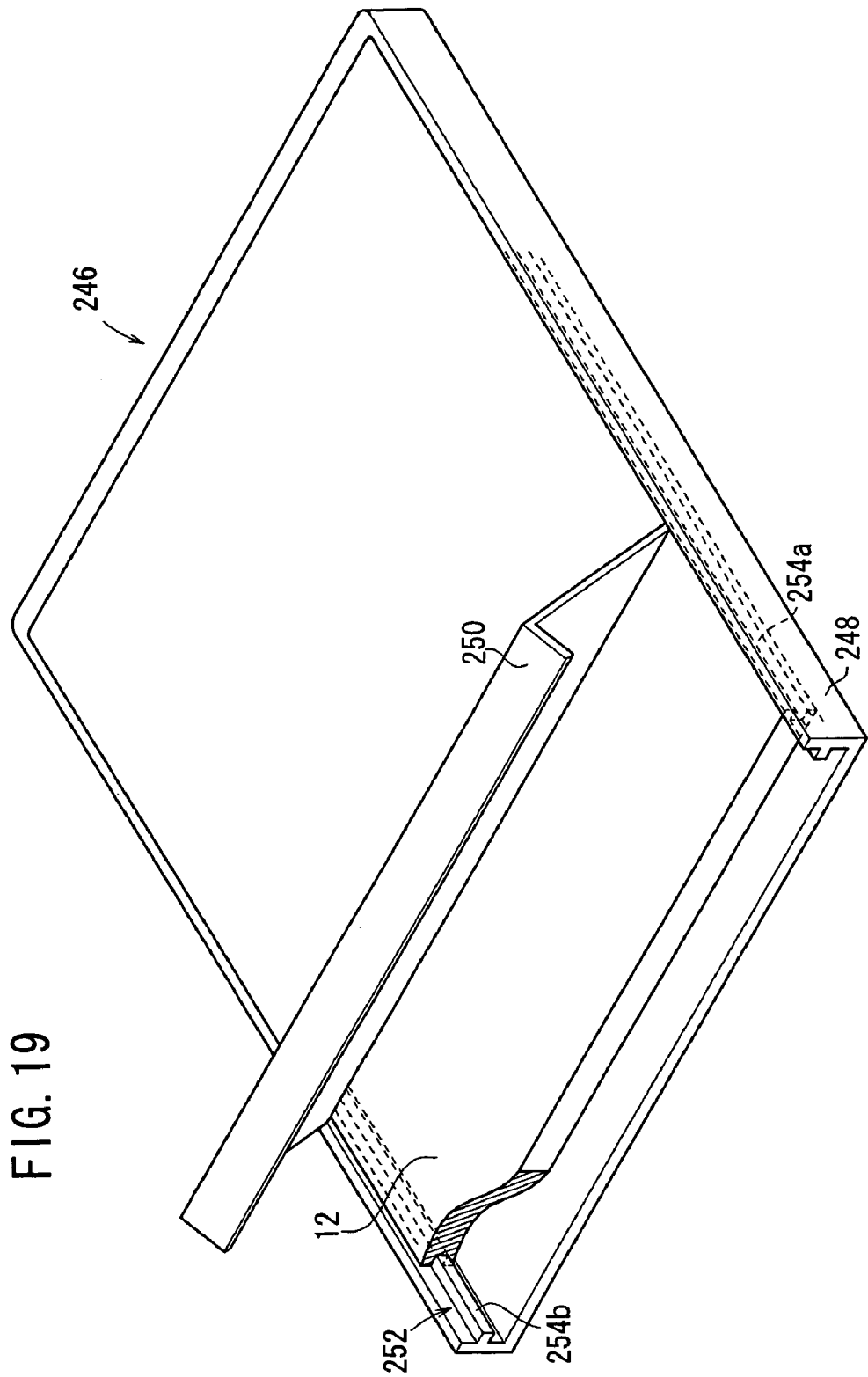
FIG. 19 is a perspective view of a radiation cassette according to a further embodiment of the present invention.
Figure 20:
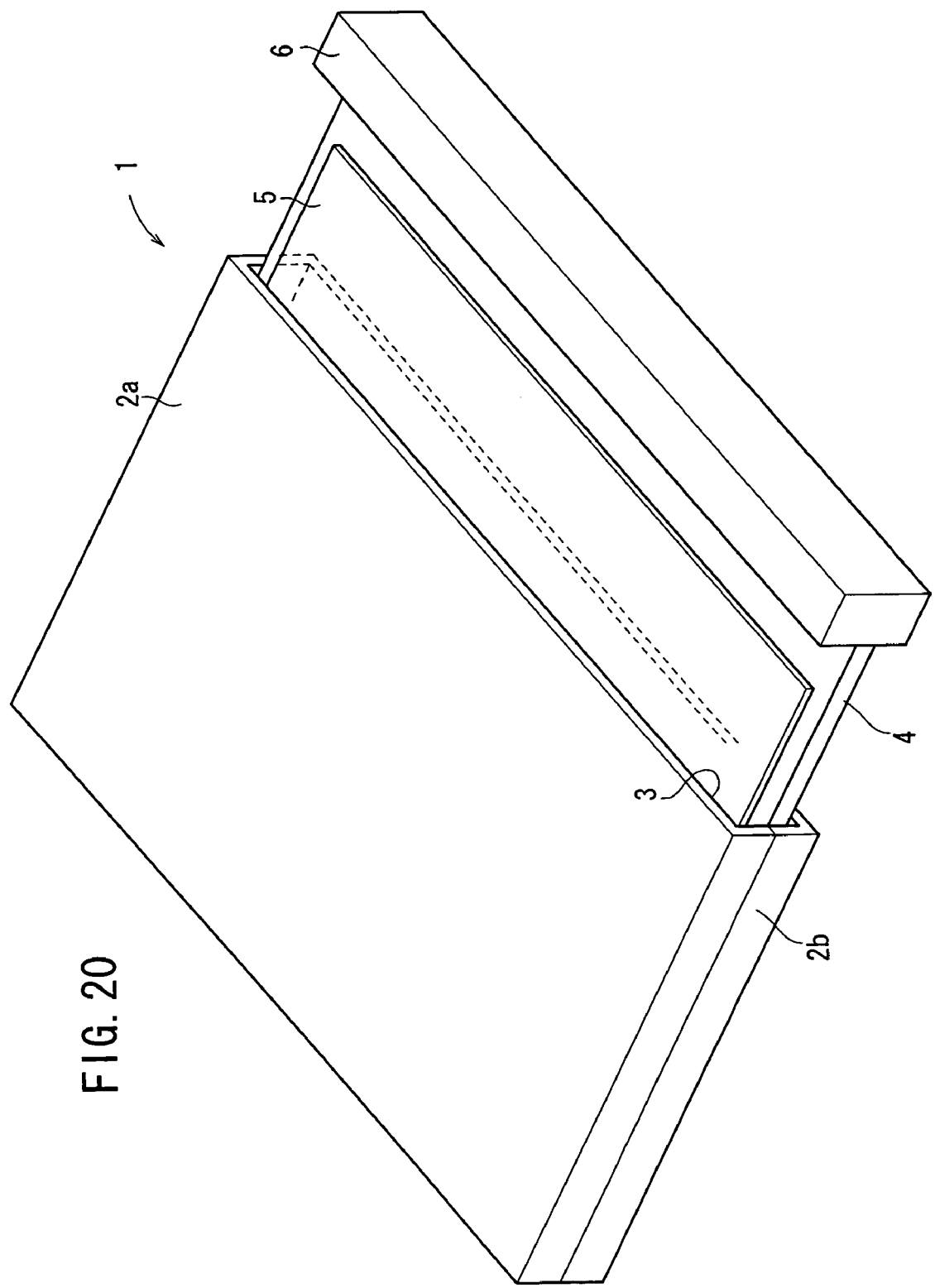
FIG. 20 is a perspective view of a conventional cassette.

FIG. 19 shows in perspective view a radiation cassette 246 according to a further embodiment of the present invention. As shown in FIG. 19, the radiation cassette 246 comprises a casing 248 for storing a stimulable phosphor plate 12 therein and a lid 250 mounted on the casing 248, wherein the lid has a portion thereof that is openable and closable with respect to the casing 248. The radiation cassette 246 has a guide structure 252 for guiding the stimulable phosphor plate 12, the guide structure 252 being disposed in the casing 248. The guide structure 252 has ledges 254a, 254b disposed on and extending along inner peripheral surfaces of the casing 248. The ledges 254a, 254b engage respectively in the recesses 78a, 78b of the stimulable phosphor plate 12.

After the lid 250 is opened, the stimulable phosphor plate 12 moves along the ledges 254a, 254b and is removed from the casing 248. Since only a portion of the lid 250 is opened with respect to the casing 248, when the radiation cassette 246 is loaded into the radiation image reading apparatus 150, a large space is not required for opening the lid 250 and removing the stimulable phosphor plate 12 from the casing 248.

Alternatively, radiation cassette 246 may have a guide structure comprising ledges disposed on the stimulable phosphor plate 12 and recesses defined in the casing 248.

Although certain preferred embodiments of the present invention have been shown and described in detail, it should be understood that various changes and modifications may be made therein without departing from the scope of the appended claims.

What is claimed is:

1. A radiation cassette for storing therein a plate-like radiation image recording medium on which radiation image information of a subject is recorded, comprising:
a casing for storing the radiation image recording medium; and
a lid openably and closably mounted on said casing, said lid facilitating removal and insertion of said radiation image recording medium;
one of said lid and said casing having a guide structure for guiding said radiation image recording medium when the radiation image recording medium is removed or inserted while said lid is open with respect to said casing;
wherein said guide structure comprises a pair of engaging members facing each other and extending in a direction in which said radiation image recording medium is removed or inserted, said radiation image recording medium having opposite sides engageable with said engaging members.

2. A radiation cassette according to claim 1, wherein one of said engaging members and said opposite sides of said radiation image recording medium is of a convex shape and the other is of a concave shape.

3. A radiation cassette according to claim 1, further comprising a stopper structure disposed between said casing and said lid for releasably limiting an angle through which said lid is open with respect to said casing.

4. A radiation cassette according to claim 1, wherein said casing and said lid are coupled to each other by a hinge and can be closed by a mating structure having grooves and ridges capable of fitting in said grooves.

5. A radiation cassette according to claim 4, wherein said mating structure comprises seal members.

6. A radiation cassette according to claim 1, further comprising an elastic pad disposed on an inner surface of said lid, wherein when said lid closes said casing, said elastic pad presses and holds said radiation image recording medium against an inner surface of said casing that serves as a radiation-irradiated side.

7. A radiation cassette according to claim 1, further comprising a grid for eliminating scattered radiation rays, disposed in said casing, said grid comprising a metal plate or a composite metal plate.

8. A radiation cassette according to claim 1, wherein at least either said lid, said casing, or other structural members of the radiation cassette are electrically conductive.

9. A radiation cassette according to claim 1, wherein said radiation cassette is made of an antibacterial material or has been subjected to antibacterial processing.

10. A radiation cassette according to claim 1, wherein said radiation cassette is made of a biodegradable material.

11. A radiation cassette according to claim 1, wherein said lid has a handwriting surface area on which information can repeatedly be written and erased by a writing instrument.

12. A radiation cassette according to claim 1, further comprising a means for storing two radiation image recording mediums in a stacked fashion for performing energy subtraction, said guide structure being arranged to guide said radiation image recording mediums when the radiation image recording mediums are removed or inserted.

13. A radiation cassette according to claim 1, wherein said guide structure further comprises one or more ledges extending in a direction in which said radiation image recording medium is removed or inserted.

14. A radiation cassette for storing therein a plate-like radiation image recording medium on which radiation image information of a subject is recorded, comprising:
a casing for storing the radiation image recording medium: and
a lid openably and closably mounted on said casing, said lid facilitating removal and insertion of said radiation image recording medium;
one of said lid and said casing having a guide structure for guiding said radiation image recording medium when the radiation image recording medium is removed or inserted while said lid is open with respect to said casing,
wherein said guide structure comprises a plurality of spaced protrusions extending in a direction perpendicular to a direction in which said radiation image recording medium is removed or inserted, which engage an engaging portion of said radiation image recording medium.

15. A radiation cassette according to claim 1, A radiation cassette for storing therein a plate-like radiation image recording medium on which radiation image information of a subject is recorded, comprising:
a casing for storing the radiation image recording medium; and
a lid openably and closably mounted on said casing, said lid facilitating removal and insertion of said radiation image recording medium;
one of said lid and said casing having a guide structure for guiding said radiation image recording medium when the radiation image recording medium is removed or inserted while said lid is open with respect to said casing,
wherein said guide structure comprises a protrusion which engages with a recess on the radiation image recording medium, said protrusion and recess being complementary in shape.

* * * * *